Jan. 19, 1937. P. J. BERGGREN 2,068,259
SHUTTER STRUCTURE FOR MOTION PICTURE MACHINES
Original Filed Dec. 20, 1928

Per Johan Berggren
INVENTOR.

BY Darby & Darby
ATTORNEYS.

Patented Jan. 19, 1937

2,068,259

UNITED STATES PATENT OFFICE 2,068,259

SHUTTER STRUCTURE FOR MOTION PICTURE MACHINES

Per Johan Berggren, New York, N. Y.

Original application December 20, 1928, Serial No. 327,200. Divided and this application May 5, 1933, Serial No. 669,522. Renewed July 2, 1936

4 Claims. (Cl. 88—19.3)

This invention relates to motion picture machines and with particularity to methods and means for light shuttering.

An object of the invention is to provide an improved method of shuttering the light passed through the projection aperture of a motion picture projecting machine.

A further object of the invention is to provide methods and means to secure the gradual fading out of one projection picture and the accelerated uncovering or fading in of the next succeeding picture to be projected.

A further object is to secure the gradual fading out of one picture and the accelerated uncovering of the next succeeding one by or through the action of the shutter.

A feature of the invention relates to a novel shutter structure for securing gradual fade-out and fade-in of projected pictures.

Other features and advantages not specifically enumerated will be apparent after a consideration of the following detail descriptions and the appended claims.

Referring to the accompanying drawing.

Figures 1, 2:
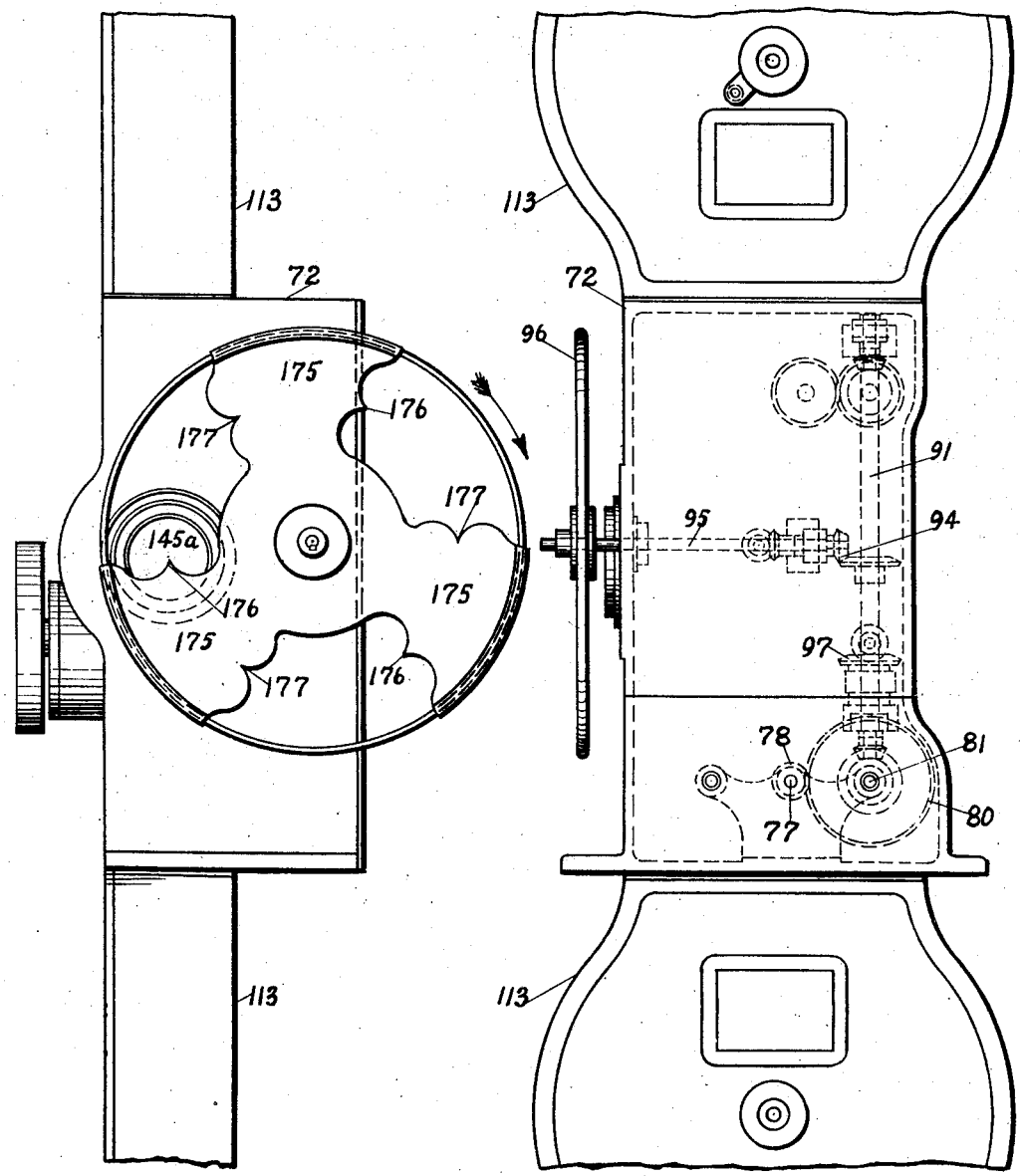
Figure 1 is a front view of a shutter according to the invention; this figure also shows a portion of the projector head.
Fig. 2 is a side view of the mechanism disclosed in Fig. 1.

While the invention is capable of general use in known types of projecting apparatus, it is disclosed herein as applied to a projector of the type described in detail in application Serial No. 327,200 to which reference may be had for a detail description of the parts of the projector not specifically disclosed herein.

The fundamental purpose in view in the present invention is to effect the change from one picture to the next succeeding one, at the rate ordinarily employed of sixteen, more or less, per second, without causing any flicker or movement of the projected picture while the shift is being made. I have already described in application Serial No. 327,200 the action of the intermittent feed as effecting a shift of the film from one stationary position into the next succeeding stationary position, in bringing successive pictures into projecting relation in approximately one-half the time interval heretofore required. The shutter action must coordinate with that of the intermittent feed, and in such a manner as to secure a smooth fade-out of the one picture and likewise a fade-in of the next succeeding picture. Even if the intermittent film feed action referred to is not employed, the fading-out and fading-in of successive pictures of the film is most desirable in order to avoid a flicker or vibration of the projected pictures at the instant of the shift, and also to avoid an abrupt change from light to dark and from dark to light by the action of the shutter. Such abrupt changes with the resultant flicker are exceedingly objectionable in that it not only spoils the picture but is also injurious to the eyes of the observers. In accordance with the principles of the present invention it is proposed to avoid this flicker action by providing a peculiar formation of the approaching and receding edges of the shutter blades which will secure a gradual fade-out of the picture last to be projected and a gradual fade-in of the picture next to be projected.

In the drawing there is shown a portion of a projector head comprising an upper casing 113 for enclosing the pay-off reel for the motion picture film, and a lower casing containing the receiving or take-up reel. The projector housing 72 is intermediate the said reels and carries the various mechanisms for advancing the film under control of the main vertical driving shaft 91. Shaft 91 is adapted to be operated in a continuous manner from a suitable power source. For this purpose it is coupled to the said source through the gear train 77, 78 and 80. Disposed at right angles to the main shaft 91 is a shaft 95 which is driven from shaft 91 through the bevel gears 94. Shaft 91 also drives a set of bevel gears 97 which control the intermittent feeding motion of the film as described in application Serial No. 327,200. Shaft 95 extends beyond the wall of the housing 72 and has attached thereto a shutter 96 comprising a set of three blades 175, all of similar shape.

In the drawing there is shown one form of shutter structure as a practical embodiment of my invention, wherein the shutter is provided with three blades 175, though in this respect my invention is not to be limited or restricted.

The approaching or forward edge of each blade is formed with a tapering projection 176, disposed in position to initially penetrate the center of the bundle of light rays projected from the lens and to be followed with a rapidly increasing or light ray obscuring area. This results in shutting out or obscuring the projecting light rays from the center of the bundle thereof outwardly, by progression, instead of suddenly or abruptly. This imparts the effect upon the eyes of a spectator of the projected picture fading-out. Just the reverse of this fading-out effect is desirable in bringing the next succeeding picture onto the screen. Therefore, in order to secure that result, I provide the rear or what may be termed the receding edge of the shutter blade with a tapering recess 177, having the same relation to the center line of the bundle of light rays from the lens as the tapering projection 176 on the forward edge of the shutter, that is to say, while the projection 176 on the forward edge of the blade initially obscures the central portion of the bundle or rays with a successive increase in obscuring area, the recess 177 in the rear edge gives an initial opening up of the light rays from the lens with a successive increase in the removal of the obscuring relation of the blade.

The blades should all be of equal area to give the best results. In case it is desired to employ a shutter having only two blades then the area of each blade should be approximately equal to the area of each shutter opening or space between the proximate edges of adjacent blades. Too many blades result in cutting off too much light which means loss of illumination or brilliancy on the screen which is objectionable.

By the provision of the pointed and tapering projection on the advancing or forward edge and the reversely outlined pointed and tapering recess on the receding or rear edge of the same blade not only are the fade-out and fade-in effects secured but there is effected a smooth, easy transition from light to dark and from dark to light, and a softening of the contrast which is restful to the eyes of the spectator and enhances the beauty and fidelity of the projected picture. These are results which are impossible of attainment with square edged shutter.

This application is a division of application Serial No. 327,200, filed December 20, 1928.

What is claimed is:

1. In a motion picture projecting apparatus, a shutter having blades, each blade having a projection on the advancing edge thereof and a recess in the receding edge thereof, the outline of the projection and the recess being the same.

2. In a motion picture projecting apparatus, a shutter having blades, each blade having a single projection on the advancing edge thereof and a single recess in the receding edge thereof, said projection and recess being pointed.

3. In a motion picture projecting apparatus, a shutter having blades, each blade having a projection on the advancing edge thereof and a recess in the receding edge thereof, said projection and recess being located to intercept first the axis of the projecting light rays.

4. In a motion picture projecting apparatus, a shutter having a sharply pointed projection on the advancing edge of the blades thereof, said projection being disposed in position to intercept the central axis of the projected light rays, and a sharply pointed recess on the trailing edge of the blade, the points of the projection and recess pointing in the direction of rotation of the shutter and being circumferentially aligned.

PER JOHAN BERGGREN.